United States Patent
Srivastava

(10) Patent No.: US 10,068,147 B2
(45) Date of Patent: Sep. 4, 2018

(54) SYSTEM AND METHOD FOR INSERTION OF PHOTOGRAPH TAKER INTO A PHOTOGRAPH

(71) Applicant: Samsung Electronics Co., Ltd., Suwon-si, Gyeonggi-do (KR)

(72) Inventor: Gaurav Srivastava, Santa Clara, CA (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 75 days.

(21) Appl. No.: 14/701,312

(22) Filed: Apr. 30, 2015

(65) Prior Publication Data
US 2016/0321515 A1 Nov. 3, 2016

(51) Int. Cl.
| | |
|---|---|
| G06K 9/00 | (2006.01) |
| G06K 9/34 | (2006.01) |
| G06T 5/00 | (2006.01) |
| G06T 11/60 | (2006.01) |
| G06K 9/46 | (2006.01) |
| G06T 5/50 | (2006.01) |
| H04N 13/00 | (2018.01) |
| H04N 13/02 | (2006.01) |
| G06T 7/50 | (2017.01) |

(52) U.S. Cl.
CPC ........... *G06K 9/342* (2013.01); *G06K 9/4642* (2013.01); *G06T 5/005* (2013.01); *G06T 5/50* (2013.01); *G06T 7/50* (2017.01); *G06T 11/60* (2013.01); *H04N 13/0007* (2013.01); *H04N 13/0239* (2013.01); *G06T 2207/10021* (2013.01); *G06T 2207/30196* (2013.01)

(58) Field of Classification Search
CPC .... G06K 9/342; G06K 9/4642; G06T 7/0051; G06T 5/50; G06T 2207/30196; G06T 2207/0239
See application file for complete search history.

(56) References Cited

U.S. PATENT DOCUMENTS

| | | | | |
|---|---|---|---|---|
| 6,069,713 | A * | 5/2000 | Kusama | H04N 1/387 358/452 |
| 6,151,009 | A * | 11/2000 | Kanade | G06T 15/405 345/641 |
| 2003/0038892 | A1* | 2/2003 | Wang | H04N 5/222 348/461 |

(Continued)

OTHER PUBLICATIONS

Extended European Search Report dated Oct. 12, 2016 in connection with European Application No. 16167544.2, 12 pages.

(Continued)

*Primary Examiner* — Aaron W Carter

(57) ABSTRACT

An electronic device is provided. The electronic device includes processing circuitry. The processing circuitry is configured to receive a first image comprising an image of a first object and a second image comprising an image of a second object. The processing circuitry is also configured to identify a depth of the second object in the second image. The processing circuitry is further configured to insert the image of the first object into the second image at a depth position based on the depth of the second object. The processing circuitry is configured to generate to display the image of the first object and the image of the second object in the second image.

20 Claims, 5 Drawing Sheets

(56) References Cited

U.S. PATENT DOCUMENTS

| | | | | |
|---|---|---|---|---|
| 2003/0122823 | A1* | 7/2003 | Howson | G06T 15/06 345/426 |
| 2003/0202120 | A1* | 10/2003 | Mack | G06T 15/20 348/578 |
| 2010/0067823 | A1* | 3/2010 | Kopf | G06K 9/00624 382/274 |
| 2011/0169825 | A1* | 7/2011 | Ishiyama | H04N 5/76 345/419 |
| 2011/0249090 | A1* | 10/2011 | Moore | G06T 19/00 348/43 |
| 2011/0255776 | A1* | 10/2011 | Mark | A63F 13/02 382/154 |
| 2011/0313653 | A1* | 12/2011 | Lindner | G01C 21/3632 701/523 |
| 2012/0127284 | A1* | 5/2012 | Bar-Zeev | G02B 27/017 348/53 |
| 2012/0314077 | A1* | 12/2012 | Clavenna, II | H04N 21/2187 348/159 |
| 2012/0327078 | A1* | 12/2012 | Liao | H04N 13/0022 345/419 |
| 2013/0142452 | A1* | 6/2013 | Shionozaki | G06T 7/0065 382/284 |
| 2013/0147801 | A1* | 6/2013 | Kurino | G06T 17/00 345/420 |
| 2013/0342526 | A1* | 12/2013 | Ng | G06T 15/205 345/419 |
| 2014/0043336 | A1* | 2/2014 | Welsh | H04N 13/0022 345/427 |
| 2014/0161333 | A1* | 6/2014 | Litvin | G01N 23/046 382/131 |
| 2014/0198187 | A1* | 7/2014 | Lukk | H04N 13/0239 348/49 |
| 2015/0009372 | A1* | 1/2015 | Min | H04N 5/247 348/262 |
| 2015/0078669 | A1* | 3/2015 | Ukil | G06K 9/00208 382/201 |
| 2015/0170370 | A1* | 6/2015 | Ukil | G06T 7/0075 382/154 |
| 2015/0170371 | A1* | 6/2015 | Muninder | G06T 7/0075 382/154 |
| 2015/0279103 | A1* | 10/2015 | Naegle | G06T 19/006 345/633 |
| 2015/0319417 | A1* | 11/2015 | Park | H04N 13/0207 348/46 |
| 2016/0180575 | A1* | 6/2016 | Iwasaki | G06T 1/20 345/422 |
| 2016/0182877 | A1* | 6/2016 | Deluca | H04N 13/0007 348/53 |
| 2016/0198097 | A1* | 7/2016 | Yewdall | H04N 5/265 348/659 |
| 2016/0321515 | A1* | 11/2016 | Srivastava | G06T 5/005 |
| 2016/0364844 | A1* | 12/2016 | Ivanchenko | G06T 7/593 |

OTHER PUBLICATIONS

Ashutosh Saxena, et al., "3-D Depth Reconstruction from a Single Still Image", International Journal of Computer Vision, Kluwer Academic Publishers, B0, vol. 76, No. 1, Aug. 16, 2007, 17 pages.

Ashutosh Saxena, et al., "Make3D: Learning 3D Scene Structure from a Single Still Image", IEEE Transactions on Pattern Analysis and Machine INtelligence, IEEE Computer Society, USA, vol. 31, No. 5, May 1, 2009,17 pages.

Takeo Kanade, et al., "Video-Rate Z Keying: A New Method for Merging Images", Internet Citation, Dec. 1, 1995, url: http://www.cs.cmu.edu/afs/cs/project/stereo-machine/www/95-38.ps.gz, 12 pages.

Communication pursuant to Article 94(3) EPC dated Jul. 11, 2017 in connection with European Patent Application No. 16 167 544.2.

* cited by examiner

SYSTEM AND METHOD FOR INSERTION OF PHOTOGRAPH TAKER INTO A PHOTOGRAPH

TECHNICAL FIELD

The present application relates generally to an electronic device including a camera and, more specifically, to capturing images using an electronic device.

BACKGROUND

Electronic devices, such as mobile terminals, often include one or more cameras for conveniently taking electronic photographs. Often, an owner or user of a mobile terminal may want to take an electronic photograph in order to capture an image of one or more individuals. The owner of the mobile terminal may also desire to be included in the photograph with the one or more individuals. However, in order for the owner of the mobile terminal to be included in the electronic photograph with the one or more individuals, the owner must ask another individual to take the picture.

SUMMARY

In a first embodiment, an electronic device is provided. The electronic device includes processing circuitry configured to receive a first image and a second image. The first image includes an image of a first object. The second image includes an image of a second object. The processing circuitry is also configured to identify a depth of the second object in the second image and is further configured to insert the image of the first object into the second image at a depth position based on the depth of the second object. The processing circuitry also is configured to generate to display the image of the first object and the image of the second object in the second image.

In a second embodiment, a method for use in an electronic device is provided. The method includes receiving a first image and a second image. The first image includes an image of a first object and the second image includes an image of a second object. The method also includes identifying a depth of the second object in the second image. The method further includes inserting the image of the first object into the second image at a depth position based on the depth of the second object. The method includes generating to display the image of the first object and the image of the second object in the second image.

In a third embodiment, an electronic device is provided. The electronic device includes a first camera configured to capture a first image of a first environment including a first object. The first image includes an image of the first object. The electronic device also includes a second camera configured to capture a second image of a second environment including a second object. The second image includes an image of the second object. The electronic device further includes a first depth sensor configured to measure a distance from the first camera to the first object. The electronic device includes processing circuitry configured to receive the first image and the second image. The processing circuitry is also configured to insert the image of the second object into the first image at a depth position based on the distance from the first camera to the first object. The processing circuitry is further configured to generate to display the image of the first object and the image of the second object in the first image.

Other technical features may be readily apparent to one skilled in the art from the following figures, descriptions, and claims. Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged image capture device or image capture system.

Figure 1:
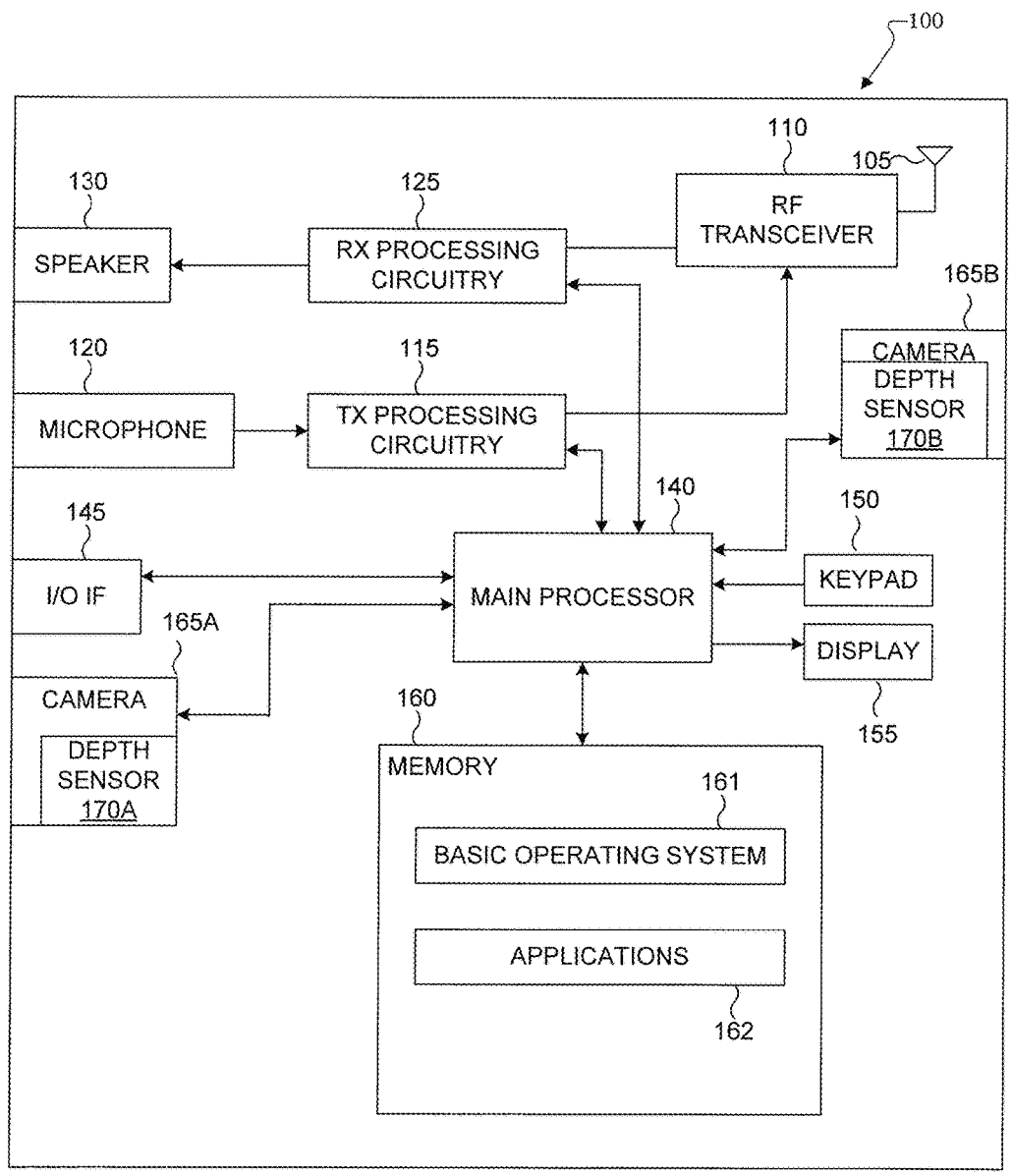
FIG. 1 illustrates an example user equipment according to this disclosure.

FIG. 1 illustrates an example UE 100 according to this disclosure. The embodiment of the UE 100 illustrated in FIG. 1 is for illustration only. However, UEs come in a wide variety of configurations, and FIG. 1 does not limit the scope of this disclosure to any particular implementation of a UE. Although UE 100 is depicted as a mobile terminal capable of wireless communications, UE 100 can be configured as any suitable device capable of capturing photographic images, such as a camera, a tablet, a portable data assistant (PDA), an electronic reader, a portable computer such as a laptop, and the like.

The UE 100 includes an antenna 105, a radio frequency (RF) transceiver 110, transmit (TX) processing circuitry 115, a microphone 120, and receive (RX) processing circuitry 125. The UE 100 also includes a speaker 130, a main processor 140, an input/output (I/O) interface (IF) 145, a keypad 150, a display 155, a memory 160, a first camera 165A, and a second camera 165B. The memory 160 includes a basic operating system (OS) program 161 and one or more applications 162.

The RF transceiver 110 receives, from the antenna 105, an incoming RF signal transmitted by an eNB of a network such as a wireless communication network. The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the main processor 140 for further processing (such as for web browsing data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

The first camera 165A is positioned on a first surface of the UE 100 such as on the same surface as the display 155 or keypad 150 and the second camera is positioned on a second surface of the UE 100 such as on a surface opposite (on the other side of the UE 100) the first surface. Thus, the first camera 165A captures an image of a first environment and the second camera 165B capture an image of a second environment when the UE 100 is positioned between the first environment and the second environment. For example, the first camera 165A captures an image of a first environment at the same or similar time that the second camera 165B captures an image of a second environment.

The first camera 165A includes a first depth sensor 170A and the second camera 165B includes a second depth sensor 170B. In certain embodiment, a single depth sensor can be used for both the first camera 165A and the second camera 165B. The first depth sensor 170A and the second depth sensor 170B identify depth positions (Z-positions) of objects or parts of objects captured in an image. For example, after capturing an image of an environment using the first camera 165A, the first depth sensor 170A identifies a depth position of an object or a point on an object captured in the image of the environment. The depth position can be a distance from the first camera 165A to the object or the point on the object, a relative depth distance between a first object in a capture image and a second object in a captured image, or a relative depth distance between a point of a first object in a capture image and a point of a second object in a captured image. The above example can also be applied to the second camera 165B and the second depth sensor 170B.

The main processor 140 can include one or more processors or other processing devices, such as processing circuitry, and execute the basic OS program 161 stored in the memory 160 in order to control the overall operation of the UE 100. For example, the main processor 140 could control the reception of forward channel signals and the transmission of reverse channel signals by the RF transceiver 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160, such as operations for positioning an image of a photograph taker in a photograph taken by the photograph taker. The main processor 140 can move data into or out of the memory 160 as required by an executing process. In some embodiments, the main processor 140 is configured to execute the applications 162 based on the OS program 161 or in response to signals received from eNBs or an operator. The main processor 140 is also coupled to the I/O interface 145, which provides the UE 100 with the ability to connect to other devices such as laptop computers and handheld computers. The I/O interface 145 is the communication path between these accessories and the main controller 140.

The main processor 140 is also coupled to the keypad 150 and the display unit 155. The operator of the UE 100 can use the keypad 150 to enter data into the UE 100. The display 155 may be a liquid crystal display or other display capable of rendering text and/or at least limited graphics, such as from web sites.

The memory 160 is coupled to the main processor 140. Part of the memory 160 could include a random access memory (RAM), and another part of the memory 160 could include a Flash memory or other read-only memory (ROM).

The main processor 140 also receives a first image comprising an image of a first object and a second image comprising an image of a second object. The main processor 140 can receive the first image or the second image from the first camera 165A or the second camera 165B, respectively. In certain embodiments, the main processor 140 receives the first image comprising an image of a first object and a second image comprising an image of a second object through wireless or wired data communication (such as from a website, via text message, via email, an image stored in memory, or the like).

The main processor 140 receives the first image that includes an image of a first object and receives a second image that includes an image of a second object at a same or similar instant in time. For example, a user, such as a picture taker, can use the UE 100 to capture an image of the user using the first camera 165A while using the second camera 165B to capture an image of a group of friends.

The main processor 140 identifies a depth of at least one object in at least one of the first image or the second image. For example, the main processor 140 receives an indication of a distance from the first camera 165A or the second camera 165B to one or more objects, such as one or more points on one or more objects, in an environment captured in an image using a depth sensor such as depth sensor 170A or depth sensor 170B. For example, after capturing the image of the user (such as the picture taker) using the first camera 165A, the first depth sensor 170A measures a distance between the camera and a plurality of points of objects, such as the user taking the picture in the first environment. Also after capturing the image of the group of people using the second camera 165B, the second depth sensor 170B measures a distance between the camera and a plurality of points of objects, such as the people in the group of people in the second environment. The main processor 140 receives the first image of the first environment or the second image of the second environment and determines a depth of one or more points of objects captured in the first image or the second image. In certain embodiments, the depth can be a relative distances between points in an image of an environment, such as a point on an object or points on different objects, or distance between the camera and one or more points in an image of the environment, such as a point on an object or points on different objects.

The main processor 140 also applies two-dimensional (2-D) image segmentation to an image of an object in at least one of the two images of the environments. For example, after capturing the image of the group of people using the second camera 165B, or after capturing the image of the user using the first camera 165A, the main processor 140 identifies an object, such as the user taking the picture, in an image using 2-D image segmentation. The main processor 140 identifies an upper portion of the user's body using 2-D image segmentation. Identifying the upper portion of the user's body enables the processor to extract the upper portion of the user's body to inset the upper portion of the user's body into the second image, as discussed further herein.

The main processor 140 applies three-dimensional (3-D) image segmentation to an image of an object in an image of an environment. For example, the main processor 140 identifies an image of a second object in the second image by applying 3-D image segmentation to the second image. For example, the main processor 140 applies 3-D image segmentation of the second image 302 by identifying depths in the images to identify one or more object images and to cluster one or more points of one or more images of objects. The main processor 140 also generates a point cluster using the 3-D image segmentation of the second image.

The main processor 140 generates a depth histogram based on each point in each of the point clusters. The depth histograms enable the main processor 140 to determine the depths of the different horizontal or vertical points on the images of the objects in the second image. In certain embodiments, the main processor 140 approximates the depth histograms (z-histograms) by normal distributions and by estimating the parameters ($\mu$, $\sigma$) for each distribution. The main processor 140 finds a z-depth that is approximated behind all objects in the captured image. The depth histograms enable the main processor 140 to determine the depths of the different horizontal or vertical points on the images of the objects in the second image. The main processor 140 determines the z-depth of the different images of the object using equation 1:

$$Z_{NEW} = \max_{i \in \{1, 2, \ldots n\}} \{\mu_i + 3\mu_i\} \quad (1)$$

The main processor 140 implements equation 1 to identify the z-depths of each of the images of the objects of the second image and to determine an optimal location to insert the image of the first object from the first image. For example, the main processor 140 locates one or more horizontal positions and vertical positions of each of the point clusters, such as, by determining an average horizontal position or vertical position for each of the one or more point clusters, an average horizontal position about a vertical center line for each of the one or more point clusters, an average vertical position about a horizontal center line for each of the one or more point clusters, or the like. The main processor 140 locates one or more optimal horizontal positions and one or more optimal vertical positions to determine an optimal horizontal position or an optimal vertical position for inserting the image of the first object into the second image so that image of the first object is visible amongst the images of the second objects when the second image is displayed.

For example, the main processor 140 determines two images having an optimal horizontal spacing difference so that the first image has a realistic appearance when inserted between the two images. The main processor 140 subsequently inserts the image of the object of the first image at an optimal position in the second image. For example, the main processor 140 determines an optimal position in the second image based on a position having a vertical, horizontal, and depth coordinate in the second image so that the image of the first object of the first image is realistically positioned between two object images of the second image within the second image.

The main processor 140 generates for display the second image including the image of the object of the first image inserted in the second image. That is, the main processor 140 generates the second image by inserting the image of the object of the first image into the second image. In certain embodiments, the main processor 140 generates a new image, such as a third image, by inserting the image of the object of the first image into the second image. As such, the third image includes the image objects of the second image and the image object of the first image. It is noted that the third image can be generated to include the image objects of the first image with an image object from the second image. That is, the third image can be generated by inserting the image of the object of the second image into the first image.

The main processor then transmits the image generated for display to a display 155. The display 155 displays the image, such as the third image or the second image including the first object from the first image and the second object of the second image. That is, the display displays an image that includes a combination of the image of the first object and the image of the second object so that image of the first object is realistically displayed with the image of the second object in the second image. In certain embodiments, the main processor 140 generates for display one or more optional positions (such depth positions, vertical positions, horizontal positions, a combination thereof, or the like) to display the image of the first object in the second image. Any of the optional positions can be used to display the first object realistically with the image of the second object in the second image.

The main processor 140 approximates the horizontal and vertical positions in the second image where the image of the first object of the first image can be inserted. For example, the main processor 140 identifies the space between the highest points in each of the point clusters. When multiple images of second objects are depicted in the second image, the main processor 140 calculates an average maximum height. The main processor 140 estimates the maximum height from a ground plane for each point cluster and determines the average height of each point cluster. In certain embodiments, to find a head of each of the point clusters depicting people, the main processor 140 assumes that height of the point cluster is 8 times the height of the head of the point cluster. Thus, the main processor 140 determines that the top ⅛ of the point cluster height is the head of the point cluster representing a person. The points within the head of the point cluster can be used to determine a head centroid. The main processor 140 uses the positions of the head centroids for each of the point clusters to determine the 3-D Euclidean distances between heads of the point clusters representing the people. In a scaled up image, the main processor 140 applies face detection to determine a bounding box for the picture taker's face (such as the image of the first object). The main processor 140 estimates the width of the face as the width of the bounding box.

To determine a horizontal position for inserting the image of the first object, the main processor 140 determines a pair of point clusters with the greatest depth positions and spaced far enough apart to fit the width of the image of the first object. The main processor 140 determines a midpoint ($x_o$, $y_o$, $z_o$) between the centroids of the heads of the two point clusters and places the center of the image of the first object on the $x_o$ and $y_o$, coordinates of the midpoint, but uses $z_{new}$ for the depth position of image of the first object. The main processor 140 can also fill in the surrounding area on the $z_{new}$ plane with pixel values from the 2-D image segmentation and scale the image of the first object for enhanced realism in the second image.

Although FIG. 1 illustrates one example of UE 100, various changes may be made to FIG. 1. For example, various components in FIG. 1 could be combined, further subdivided, or omitted and additional components could be added according to particular needs. As a particular example, the main processor 140 could be divided into multiple processors, such as one or more central processing units (CPUs) and one or more graphics processing units (GPUs). Also, while FIG. 1 illustrates the UE 100 configured as a mobile telephone or smartphone, UEs could be configured to operate as other types of mobile or stationary devices.

Figure 2:
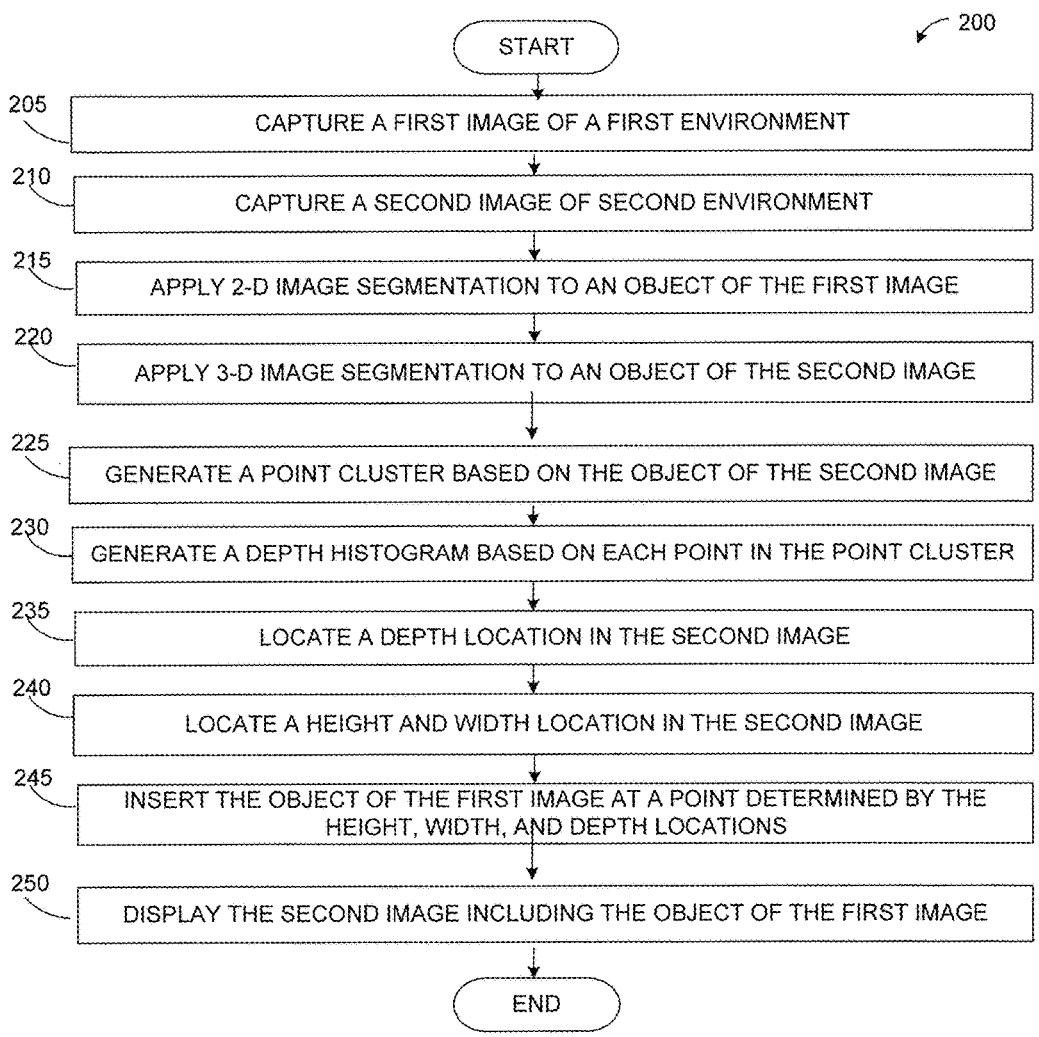
FIG. 2 illustrates a process for inserting a photograph taken into a photograph according to this disclosure.
Figure 3:
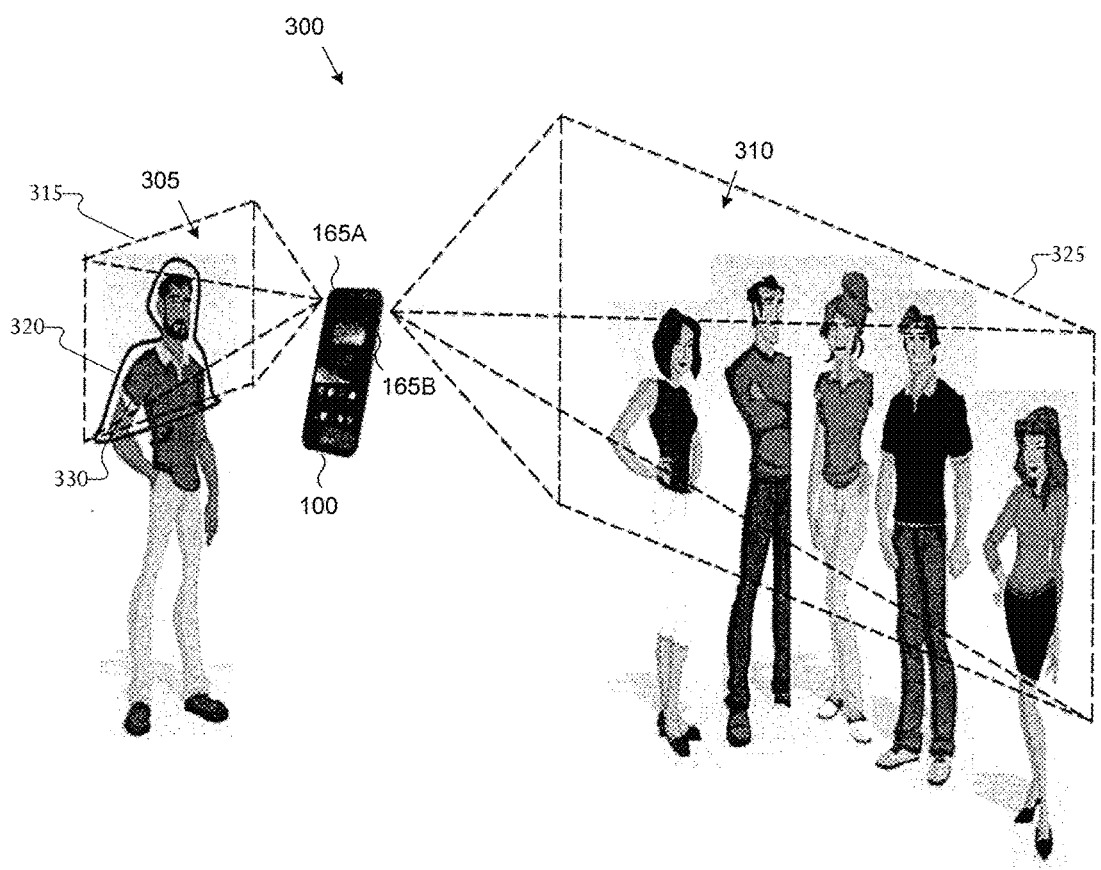
FIG. 3 illustrates an example diagram of applying two-dimensional image segmentation to an object of the first image according to this disclosure.
Figure 4:
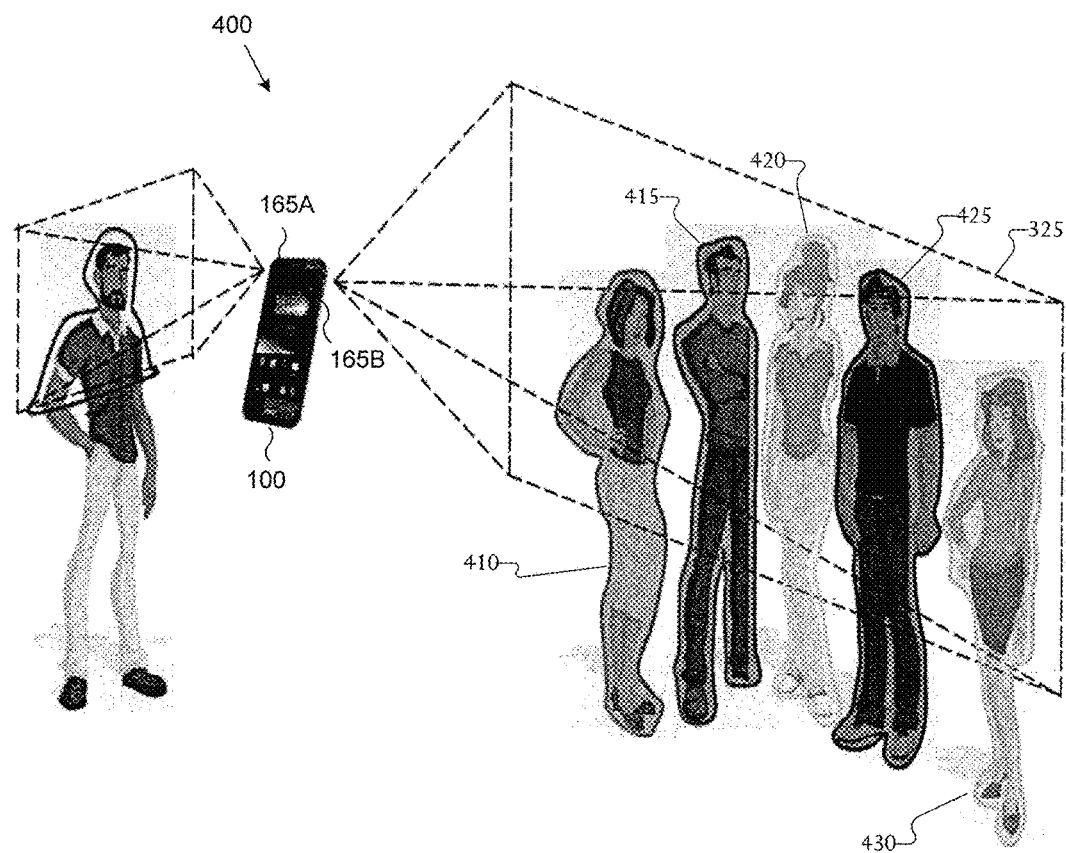
FIG. 4 illustrates an example diagram of applying three-dimensional image segmentation to an object of the second image and generating a point cluster based on the object of the second image according to this disclosure.
Figure 5:
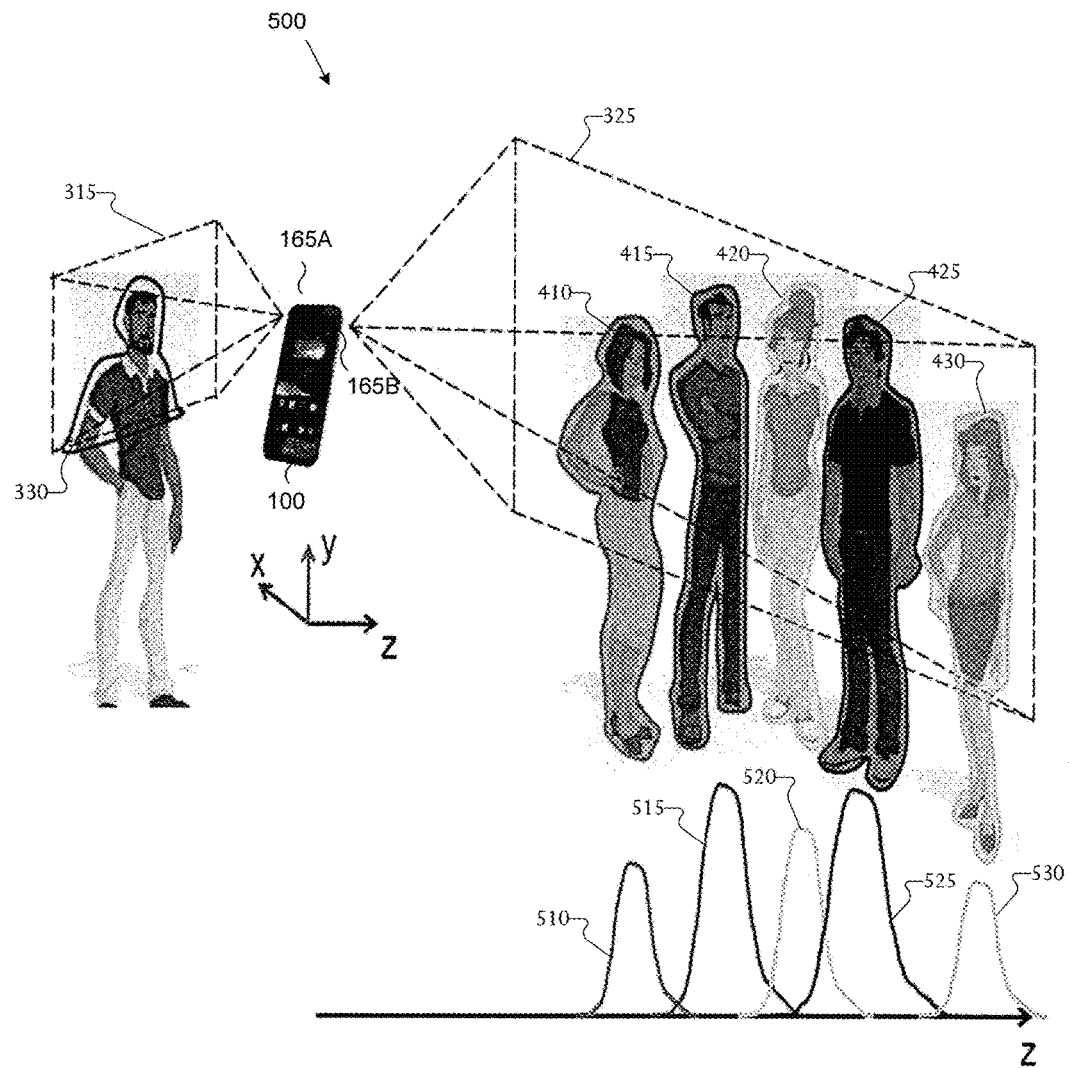
FIG. 5 illustrates an example diagram of generating a depth histogram based on each point in the point cluster according to this disclosure.

FIG. 2 illustrates an example flow diagram of a method 200 according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a mobile device capable of capturing images.

At step 205, the UE 100 captures a first image of a first environment. The first image includes an image of a first object. At step 210, the UE 100 captures a second image of a second environment. The second image includes an image of a second object. In certain embodiments, the UE 100 captures the first image and the second image at substantially the same time or at a similar time. For example, as illustrated in the 2-D image segmentation 300 example shown in FIG. 3, the UE 100 captures an image of a first environment 305 using a first camera 165A and an image of a second environment 310 using a second camera 165B.

At step 215, the UE 100 identifies the image of the first object in the first image by applying 2-D image segmentation 300 on the first image 315. For example, as illustrated in the 2-D image segmentation 300 example shown in FIG. 3, the UE 100 uses 2-D image segmentation 300 to identify the upper torso 320 and head of the image of the user 330 in the first image 315. At step 220, the UE 100 identifies an image of a second object in the second image 325 by applying 3-D image segmentation to the second image 325. For example, as illustrated in the 3-D image segmentation 400 example shown in FIG. 4, the UE 100 applies 3-D image segmentation 400 of the second image 325 by identifying depths in the images to identify one or more object images and to cluster one or more points of one or more images of objects.

At step 225, the UE 100 generates a point cluster using the 3-D image segmentation 400 of the second image. For example, using the 3-D image segmentation 400 of the second image 325, the UE 100 generates point clusters 410, 415, 420, 425, and 430 of images of objects in the second image 325. That is, the UE 100 generates point clusters 410 for a first image object; point clusters 415 for a second image object; point clusters 420 for a third image object; point clusters 425 for a fourth image object; and point clusters 430 for a fifth image object. The UE 100 can generate point clusters for all the image objects in the picture or a subset of the image objects in the picture. At step 230, the UE 100 generates a depth histogram based on each point in the point clusters 410, 415, 420, 425, and 430. For example, as shown in the histogram generation 500 depicted in FIG. 5, the UE 100 generates depth histograms 510, 515, 520, 525, and 530 associated respectively with each of the point clusters 410, 415, 420, 425, and 430. That is, the UE 100 generates a first depth histogram 510 associated with point clusters 410; a second depth histogram 515 associated with point clusters 415; a third depth histogram 520 associated with point clusters 420; a fourth depth histogram 525 associated with point clusters 425; and a fifth depth histogram 530 associated with point clusters 430. The depth histograms enable the UE 100 to determine the depths of the different horizontal or vertical points on the images of the objects in the second image 325.

At step 235, the UE 100 locates one or more depths of each of the point clusters 410, 415, 420, 425, and 430 using the depth histograms 510, 515, 520, 525, and 530. For example, the UE 100 determines an average depth for one or more point clusters 410, 415, 420, 425, and 430, an average depth about a center line for one or more point clusters 410, 415, 420, 425, and 430, or the like. The UE 100 locates one or more possible optimal depths to determine an optimal depth for inserting the image of the first object, namely the image of the user 330, into the second image 325 so that image of the user 330 is visible amongst the images of the second objects when the second image 325 is displayed. For example, the UE 100 can determine two images having an optimal depth difference so that the image of the user 330 has a realistic appearance when inserted between the two images in the second image 325.

At step 240, the UE 100 locates one or more horizontal positions and vertical positions for each of the point clusters 410, 415, 420, 425, and 430. For example, the UE 100 determines an average horizontal position or vertical position for one or more point clusters 410, 415, 420, 425, and 430, an average horizontal position about a vertical center line for one or more point clusters 410, 415, 420, 425, and 430, an average vertical position about a horizontal center line for one or more point clusters 410, 415, 420, 425, and 430, or the like. The UE 100 locates one or more possible optimal horizontal positions and vertical positions to determine an optimal horizontal position or vertical position for inserting the image of the user 330 into the second image 325 so that image of the user 330 is visible amongst the images of the second objects when the second image 325 is displayed. For example, the UE 100 can determine two images having an optimal horizontal spacing difference so that the image of the user 330 in the first image 315 has a realistic appearance when inserted between the two images in the second image 325.

At step 245, the UE 100 inserts the image of the object, namely the image of the user 330, of the first image 315 at an optimal position in the second image 325. For example, the UE 100 determines an optimal position in the second image 325 based on a position having a vertical, horizontal, and depth coordinate in the second image so that the image of the user 330 of the first image 315 is realistically positioned between two object images of the second image 325 within the second image 325. At step 250, the UE 100 displays the second image 325 including the image of the object of the first image inserted in the second image. That is, the main processor 140 in the UE 100 generates an image for display on the display 155. The image for display is the second image 325 that now includes the image of the user 330 of the first image 315. In certain embodiments, the image for display is a newly generated image that includes objects of the second image 325, such as a copy of the second image 325, including the image of the user 330 of the first image 315.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a display; and
processing circuitry configured to:
receive a first image and a second image, the first image comprising an image of a first object and the second image comprising an image of a second object,
identify a depth, a horizontal position, and a vertical position of the second object in the second image,
calculate, based on the depth, the horizontal position, and the vertical position of the second object, an optimal horizontal, vertical, and depth position at which to insert the image of the first object into the second image so that the image of the first object is realistically positioned relative to the second object,
insert the image of the first object into the second image at the calculated optimal horizontal, vertical, and depth position,
generate a third image comprising the image of the first object and the image of the second object in the second image, and
cause the display to display the third image.

2. The electronic device of claim 1, wherein the image of the first object obstructs a portion of the second object when the first object and the second object is displayed in the second image.

3. The electronic device of claim 1, wherein the processing circuitry is configured to identify the first object in the first image using two-dimensional (2-D) image segmentation.

4. The electronic device of claim 1, wherein the processing circuitry is configured to identify the depth of the second object in the second image using three-dimensional (3-D) image segmentation.

5. The electronic device of claim 1, wherein the processing circuitry is configured to insert the first object into the second image using 3-D image segmentation to identify a horizontal position, a vertical position, and the depth position of one or more points in the second image.

6. The electronic device of claim 1, wherein the processing circuitry is configured to identify the depth of the image of the second object in the second image using 3-D image segmentation to generate a depth histogram of one or more points of the second image.

7. The electronic device of claim 1, wherein the processing circuitry is configured to insert the image of the first object into the second image so that the image of the first object does not share at least the depth position with the image of the second object.

8. The electronic device of claim 1, wherein the processing circuitry is configured to insert the image of the first object into the second image so that the image of the first object does not share at least one of a horizontal position, a vertical position, or the depth position with the image of the second object.

9. A method for use in an electronic device, the method comprising:
receiving a first image and a second image, the first image comprising an image of a first object and the second image comprising an image of a second object,
identifying a depth, a horizontal position, and a vertical position of the second object in the second image,
calculating, based on the depth, the horizontal position, and the vertical position of the second object, an optimal horizontal, vertical, and depth position at which to insert the image of the first object into the second image so that the image of the first object is realistically positioned relative to the second object,
inserting the image of the first object into the second image at the calculated optimal horizontal, vertical, and depth position, and
generating a third image comprising the image of the first object and the image of the second object in the second image, the third image suitable for display on a display of the electronic device.

10. The method of claim 9, wherein the first object obstructs a portion of the second object when the first object and the second object is displayed in the second image.

11. The method of claim 9, further comprising identifying the first object in the first image using two-dimensional (2-D) image segmentation.

12. The method of claim 9, wherein identifying the depth of the second object in the second image comprises using three-dimensional (3-D) image segmentation.

13. The method of claim 9, wherein calculating the depth position at which to insert the image of the first object into the second image based on the depth of the second object comprises using 3-D image segmentation to identify a horizontal position, a vertical position, and the depth position of one or more points in the second image.

14. The method of claim 9, wherein identifying the depth of the image of the second object in the second image comprises using 3-D image segmentation to generate a depth histogram of one or more points of the second image.

15. The method of claim 9, wherein inserting the image of the first object into the second image comprises inserting the image of the first object into the second image so that the image of the first object does not share at least the depth position with the image of the second object.

16. The method of claim 9, wherein inserting the image of the first object into the second image comprises inserting the image of the first object into the second image so that the image of the first object does not share at least one of a horizontal position, a vertical position, or the depth position with the image of the second object.

17. An electronic device comprising:
   a first camera configured to capture a first image of a first environment including a first object, wherein the first image comprises an image of the first object;
   a second camera configured to capture a second image of a second environment including a second object, wherein the second image comprises an image of the second object;
   a first depth sensor configured to measure a distance from the first camera to the first object;
   a display; and
   processing circuitry configured to:
      receive the first captured image comprising the image of the first object,
      receive the second captured image comprising the image of the second object,
      calculate, as a function of a horizontal position of the first object, a vertical position of the first object, and the distance from the first camera to one or more points of the first object in the first image, an optimal horizontal, vertical, and depth position at which to insert the image of the second object into the first image so that the image of the second object is realistically positioned relative to the first object,
      insert the image of the second object into the first image at the calculated optimal horizontal, vertical, and depth position,
      generate a third image comprising the image of the first object and the image of the second object in the first captured image, and
      cause the display to display the third image.

18. The electronic device of claim 17, wherein the first object obstructs a portion of the second object when the first object and the second object are displayed in the second captured image.

19. The electronic device of claim 17, further comprising a display screen configured to display the image of the first object and the image of the second object in the first captured image.

20. The electronic device claim 17, wherein the processing circuitry is further configured to:
   apply three-dimensional (3-D) image segmentation to the first image of the first object,
   generate a point cluster of the image of the first object in the first captured image, and
   generate a depth histogram of the image of the first object in order to insert the image of the second object into the first captured image at the depth position.

* * * * *